United States Patent [19]
Nagel

[11] 3,738,132
[45] June 12, 1973

[54] CHAIN LOCK
[76] Inventor: Alice R. Nagel, 68-01 60th Road, Maspeth, N.Y.
[22] Filed: June 21, 1971
[21] Appl. No.: 154,875

Related U.S. Application Data
[63] Continuation-in-part of Ser. No. 842,206, July 16, 1969, Pat. No. 3,585,823.

[52] U.S. Cl. .................................................. 70/49
[51] Int. Cl. ........................ E05b 67/18, E05b 67/24
[58] Field of Search .................... 70/49, 30, 14, 15, 70/16, 18

[56] References Cited
UNITED STATES PATENTS
1,380,719  6/1921  Johnson .................................. 70/49
1,545,902  7/1925  Johnson .................................. 70/49
3,585,823  6/1971  Nagel ..................................... 70/49
507,948   10/1893  Waine .................................... 70/49

FOREIGN PATENTS OR APPLICATIONS
178,900   4/1922  Great Britain .......................... 70/49

Primary Examiner—Robert L. Wolfe
Attorney—Sparrow & Sparrow

[57] ABSTRACT

A chain lock arrangement with a housing having either one passage for the chain or one passage for the chain and one passage for a locking plug or two passages for the chain and at least one latch bolt in the housing to automatically lock the chain in the housing upon inserting the same into the passage, or two latch bolts, one to lock the chain and the other to lock the chain or plug, and a lock cylinder in the housing, operable for unlocking the latch bolts.

5 Claims, 13 Drawing Figures

PATENTED JUN 12 1973  3,738,132
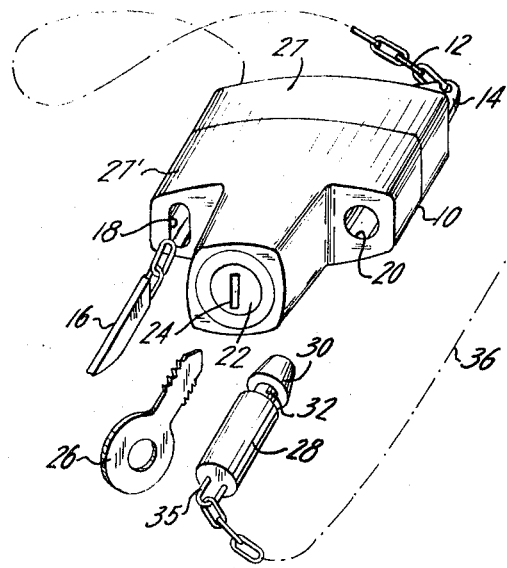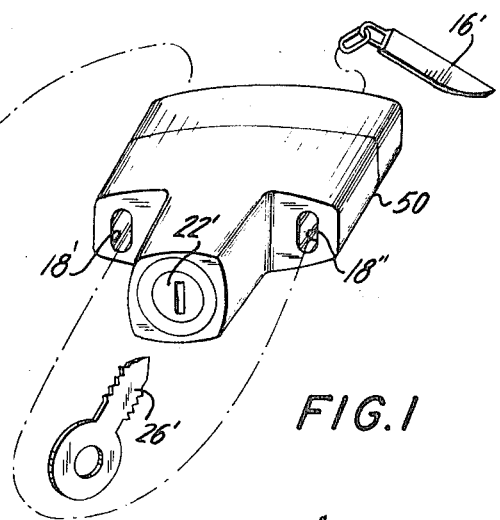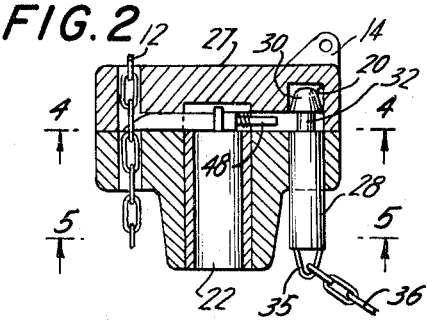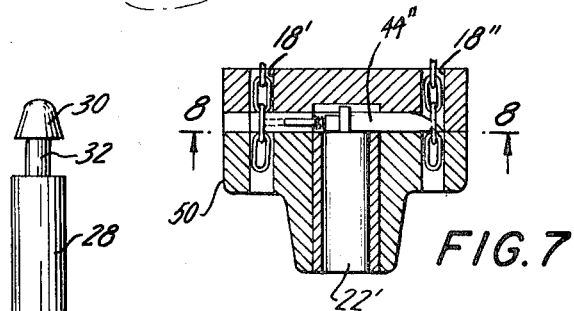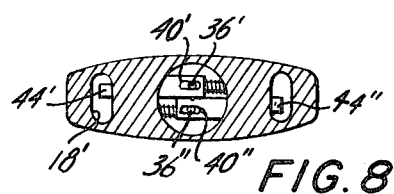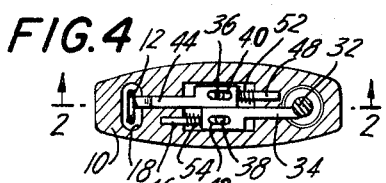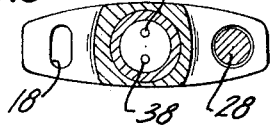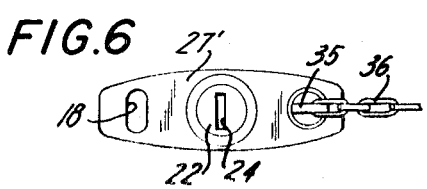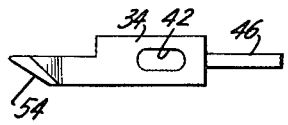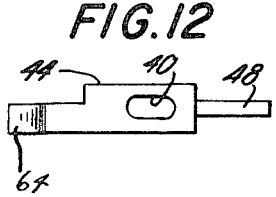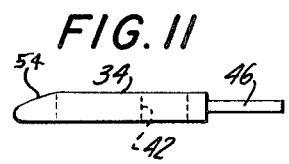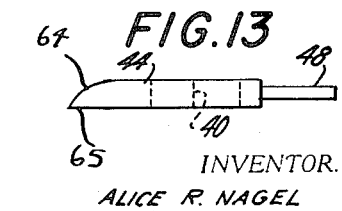
INVENTOR.
ALICE R. NAGEL
BY
SPARROW AND SPARROW
ATTORNEYS

CHAIN LOCK

CROSS REFERENCE TO RELATED APPLICATIONS

This application is a continuation-in-part of my co-pending application Ser. No. 842,206, filed July 16, 1969 and now U.S. Pat. No. 3,585,823.

BACKGROUND OF THE INVENTION

The need for a reliable device to lock pets in automobiles and other unattended areas, to prevent theft, has been demonstrated by the great number of pets stolen in recent years. Further need for a quick and conveniently operated locking device, with a fully adjustable chain length, exists for bycicles, small motorcycles, and other mobile devices which remain parked in unattended places. A still further need exists for a quick and simply operated device to replace the conventional handcuff, so as to allow the person manacled to be locked to a fixed object, such as a lamp post, or to be manacled hand and foot. Most locking devices for such purposes, which are known from prior art, lack compactness, adjustability to various chain lengths required for different applications or a reliable and quick operation for tightening the locking chain without the use of keys or the like removable parts. Some of the known devices, such as illustrated in the U. S. Pat. No. 2,465,008 are too large to be conveniently put in a pocket or in a lady's handbag. These and other shortcomings of the prior art are overcome by this invention.

SUMMARY

The present invention is principally directed to a compact lock housing with self-latching bolts and a key-operated tumbler lock to release the latching bolts. The housing has two passages for a chain which can be easily fed through in one direction, or it may have one passage for the chain and the other passage adapted to receive a plug which would be attached to one end of a chain from a similar housing having two chain passages, or it may have only one passage for the chain.

It is an object of the present invention to provide a compact, sturdy, easily adjustable, quick locking device.

Another object of the present invention is to provide an adjustable locking device which is self-locking and can be unlocked only by a key.

A further object of the present invention is to provide a locking device which is adaptable to encircle the neck of a pet as an adjustable leash, as well as attaching the device to a steering wheel, lamp post, parking meter or the like.

Yet another object of the present invention is to provide a locking device for handcuffing or shackling a prisoner, as well as securing the prisoner to a fixed object, such as a lamp post.

A still further object of the present invention is to provide a locking device for a door or gate.

BRIEF DESCRIPTION OF THE DRAWING

FIG. 1 is a perspective view of a first lock housing embodying one chain passage and one plug passage and a second lock housing having two chain passages;

FIG. 2 is a vertical section of the first lock housing with one chain passage and one plug passage, taken along line 2—2 of FIG. 4.

FIG. 3 is a top view of the first lock housing.

FIG. 4 is a transverse section, taken along line 4—4 of FIG. 2;

FIG. 5 is a transverse section, taken along line 5—5 of FIG. 2;

FIG. 6 is a bottom view of the housing shown in FIG. 2.

FIG. 7 is a vertical section of the second locking housing with two chain passages;

FIG. 8 is a transverse section, taken along section line 8—8 of FIG. 7;

FIG. 9 is a side elevation of the locking plug;

FIG. 10 is a top view of the latch bolt for the plug shown in FIG. 9;

FIG. 11 is a side elevation of the latch bolt shown in FIG. 10;

FIG. 12 is a top view of the latch bolt for the locking chain; and

FIG. 13 is a side elevation of the latch bolt shown in FIG. 12.

DESCRIPTION OF THE PREFERRED EMBODIMENT

Referring now in more detail to the drawing illustrating a preferred embodiment by which the invention may be realized, there is in FIG. 1 a lock housing 10 which consists of a lower part 27' and a top part 27. On one side of housing 10 is a chain passage 18 through which the guide end 16 of a chain 12 can be easily inserted. A cylinder lock 22, having a key aperture 24, is rotatably disposed in lower part 27' of housing 10 between chain passage 18 and a plug bore 20.

As illustrated in FIGS. 2–5 and 10–13, cylinder lock 22 has two axially extending pins 36 and 38 on one end thereof, which engage the corresponding elongated apertures 40 and 42 in the latch bolts 44 and 34. Guide pins 46 and 48, respectively, are provided at the rear end of bolts 34 and 44, and compression springs 52 and 54 are positioned on guide pins 48 and 46, respectively, urging lock bolts 34 and 44 forward into the latching position.

Bolts 34 and 44 are shown in locked position in both FIGS. 2 and 4. Bolt 34 enters the recess 32 intermediate the end 30 and the cylindrical body part of the plug 28. Bolt 44 extends through a link of chain 12, locking the chain in place. Chain 12 may be secured at one end to bracket 14 of housing 10. An additional link chain 36 may be secured on one end thereof to the bracket 35 at the end of plug 28. Link chain 36 can be passed through identical chain passages 18',18" in a second lock housing 50. As illustrated in FIGS. 8, lock cylinder 22' includes axially aligned pins 36' and 36" which engage the enlarged apertures 42'42" in the latch bolts 44',44". The ends of latch bolts 44'44" engage the chain links in the same manner as has been described above for latch bolt 44. A guide end 16', similar to guide end 16, may be fastened on the other end of chain 36 to facilitate threading the chain 36 through passages 18',18" of housing 50.

In order to enable chains 12 and 36 and plug 28 to be automatically locked into their respective housings without the use of a key, latch bolts 34 and 44 have special front latching ends 54 and 64. Latch bolts 44' and 44" have ends similar to end 64. Latch bolts 34,44 and 44',44" are arranged side by side in housings 10 and 50, respectively, in order to provide very compact and small housings 10 and 50. Since latch bolt 34 is slightly eccentric to the center line of plug 28, front end 54 of the latter is slanted in two planes which are at right angles to one another. This construction permits the automatic latching of plug 28 when the same is inserted into bore 20. By inserting key 26 into cylinder 22 and rotating the latter, latch bolt 34 is withdrawn from recess 32 releasing plug 28. In a similar manner, the front end 64 of latch bolt 44 is arcuate so that chain 12 can be threaded through passage 18 with very little resistance because latch bolt 44 is pushed back against spring 52 since the links of chain 12 can slide over arcuate front end 64. Spring 52 urges latch bolt 44 forward so that it engages a link of chain 12 and thus the chain is automatically captured in the direction of the flat portion 65 of the end of latch bolt 44, in the same manner as a pawl permits movement of a ratchet wheel in only one direction, and can only be released by a turn of lock cylinder 22 which will withdraw latch bolt 44 from chain 12. Latch bolts 44' and 44" work in a similar manner. It is understood that it is possible to provide a housing similar to housing 10 without plug bore 20 or latch bolt 34.

As is evident by the foregoing, chain 12 may be placed around the neck of an animal, or through its collar, and chain 36 may be placed around a stationary object. Only by inserting keys 26 and 26' into cylinders 22 and 22', respectively, and turning, can the chains and plug be released. It is understood that the latch bolts may be set up in their housing to accomodate the chain and plug from either direction.

While the invention has been described and illustrated with respect to certain preferred embodiments, it will be understood by those skilled in the art after understanding the principle of the invention, that various changes and modifications may be made without departing from the spirit and scope of the invention.

I claim:

1. A chain lock of the type including an encircling chain comprising:
   A. a first lock housing having a chain passage extending completely therethrough and a chain leash plug housing extending from one end of said housing and terminating therewithin and including:
      i. a first lock tumbler with a key aperture rotatably supported in said lock housing for rotation between a locked position and an unlocked position;
      ii. a first chain locking bolt connected to said tumbler and extensible into said chain passage as said tumbler is rotated, said chain locking bolt having an arcuate end extensible into said chain passage and being operable when said first lock tumbler is in the locked position to inhibit movement of a chain in one direction through said chain passage and to permit free movement of the chain in the opposite direction through said chain passage and further being operable when said first lock tumbler is in the unlocked position to permit movement of the chain in both directions;
      iii. a plug locking bolt connected to said tumbler and extensible reciprocably into said chain leash plug housing as said tumbler is rotated;
   B. a linked chain connected to said lock housing and extensible through said chain locking passage; and
   C. a key insertable into said lock tumbler, so as to rotate said tumbler;
   D. a second lock housing having two chain passages extending completely through either side and including:
      i. a second lock tumbler with key aperture rotatably supported therein for rotation between a locked position and an unlocked position;
      ii. a pair of second chain locking bolts connected to said tumbler and extensible into said chain passages as said tumbler is rotated;
      iii. a linked chain extensible through said chain passages and having at one end a locking plug complementally engageable with said chain leash plug housing and said plug locking bolt in said first housing and at its other end having a guide member; said plug having a substantially annular reduced diameter portion providing locking clearance for said plug locking bolt; and
   E. a key insertable in said second lock tumbler.

2. The chain lock according to claim 1, wherein each of said second chain locking bolts has an arcuate end extensible into said chain passage and being operable when said second lock tumbler is in the locked position to inhibit movement of a chain in one direction through said chain passage and to permit free movement of the chain in the opposite direction through said chain passage and further being operable when said second lock tumbler is in the unlocked position to permit movement of the chain in both directions.

3. The chain lock according to claim 1, wherein compression spring means are interspersed between the inner ends of said first and second chain locking bolts and plug locking bolt and said housings so as to urge said bolts respectively through said chain passages and said plug aperture.

4. The chain lock according to claim 2, wherein compression spring means are interspersed between the inner ends of said first and second chain locking bolts and plug locking bolt and said housings so as to urge said bolts respectively through said chain passages and said plug aperture.

5. A chain lock of the type including an encircling chain comprising:
   A. a lock housing having a chain passage extending completely therethrough and including:
      i. a lock tumbler with a key aperture rotatably supported in said lock housing for rotation between a locked position and an unlocked position;
      ii. a chain locking bolt connected to said tumbler and extensible into said chain passage as said tumbler is rotated, said chain locking bolt having an arcuate end extensible into said chain passage and being operable when said lock tumbler is in the locked position to inhibit movement of a chain in one direction through said chain passage and to permit free movement of the chain in the opposite direction through said chain passage and further being operable when said lock tumbler is in the unlocked position to permit movement of the chain in both directions;
   B. a linked chain connected to said lock housing and extensible through said chain passage; and
   C. a key insertable into said lock tumbler, so as to rotate said tumbler.

* * * * *